(12) United States Patent
Coburn et al.

(10) Patent No.: US 9,573,788 B2
(45) Date of Patent: Feb. 21, 2017

(54) DEVICE FOR WINDING ELONGATE FLEXIBLE OBJECTS

(71) Applicants: Scott Coburn, Calgary (CA); Geoff Hoover, Calgary (CA)

(72) Inventors: Scott Coburn, Calgary (CA); Geoff Hoover, Calgary (CA)

(*) Notice: Subject to any disclaimer, the term of this patent is extended or adjusted under 35 U.S.C. 154(b) by 463 days.

(21) Appl. No.: 14/089,688

(22) Filed: Nov. 25, 2013

(65) Prior Publication Data

US 2015/0144725 A1    May 28, 2015

(51) Int. Cl.
| | |
|---|---|
| B65H 75/22 | (2006.01) |
| B65H 75/28 | (2006.01) |
| B65H 75/40 | (2006.01) |
| B65H 75/44 | (2006.01) |
| H02G 11/02 | (2006.01) |
| H02G 11/00 | (2006.01) |

(52) U.S. Cl.
CPC .............. *B65H 75/22* (2013.01); *B65H 75/28* (2013.01); *B65H 75/406* (2013.01); *B65H 75/4476* (2013.01); *B65H 2701/34* (2013.01); *H02G 11/00* (2013.01); *H02G 11/02* (2013.01)

(58) Field of Classification Search
CPC ....... B65H 75/22; B65H 75/28; B65H 75/285; B65H 75/406; B65H 75/4473; B65H 75/4476; B65H 2701/34
See application file for complete search history.

(56) References Cited

U.S. PATENT DOCUMENTS

| | | |
|---|---|---|
| 4,062,430 A | 12/1977 | Momberg |
| 4,123,012 A | 10/1978 | Hough |
| 4,177,961 A | 12/1979 | Gruenewald |
| 4,261,529 A | 4/1981 | Sandberg et al. |
| 4,586,675 A | 5/1986 | Brown |
| 4,688,739 A | 8/1987 | Moore |
| 4,872,622 A | 10/1989 | Mansfield |
| 5,348,240 A | 9/1994 | Carmo et al. |
| 6,003,803 A | 12/1999 | Knapp et al. |
| 6,024,317 A | 2/2000 | Kovacik et al. |
| 6,158,686 A | 12/2000 | Lawrence |
| 6,554,218 B2 | 4/2003 | Buyce et al. |
| 6,942,173 B1 | 9/2005 | Abramov |
| 6,962,306 B2 | 11/2005 | West |
| 7,048,222 B1 | 5/2006 | Curtiss |
| 7,455,258 B2 | 11/2008 | Proebstle |
| 2006/0278749 A1 | 12/2006 | Hutchinson |
| 2007/0156018 A1 | 7/2007 | Krauter et al. |
| 2011/0220754 A1 | 9/2011 | Merten et al. |
| 2012/0068028 A1* | 3/2012 | Arnold ................. F16B 5/07 248/205.2 |

FOREIGN PATENT DOCUMENTS

GB        2253650 A  *  9/1992  ............ B65H 75/04

* cited by examiner

*Primary Examiner* — William E Dondero

(57) ABSTRACT

A device for winding elongate flexible objects is disclosed herein. The device includes a rigid member extending along a central axis between first and second ends. The device also includes a first fork having a base mounted to the rigid member at the first end of the rigid member and a plurality of tines supported on the base. The device also includes a second fork member having a base mounted to the rigid member at the second end of the rigid member and a plurality of tines supported on the base. The first fork and the second fork are further defined as both being removably engaged with the rigid member.

15 Claims, 3 Drawing Sheets

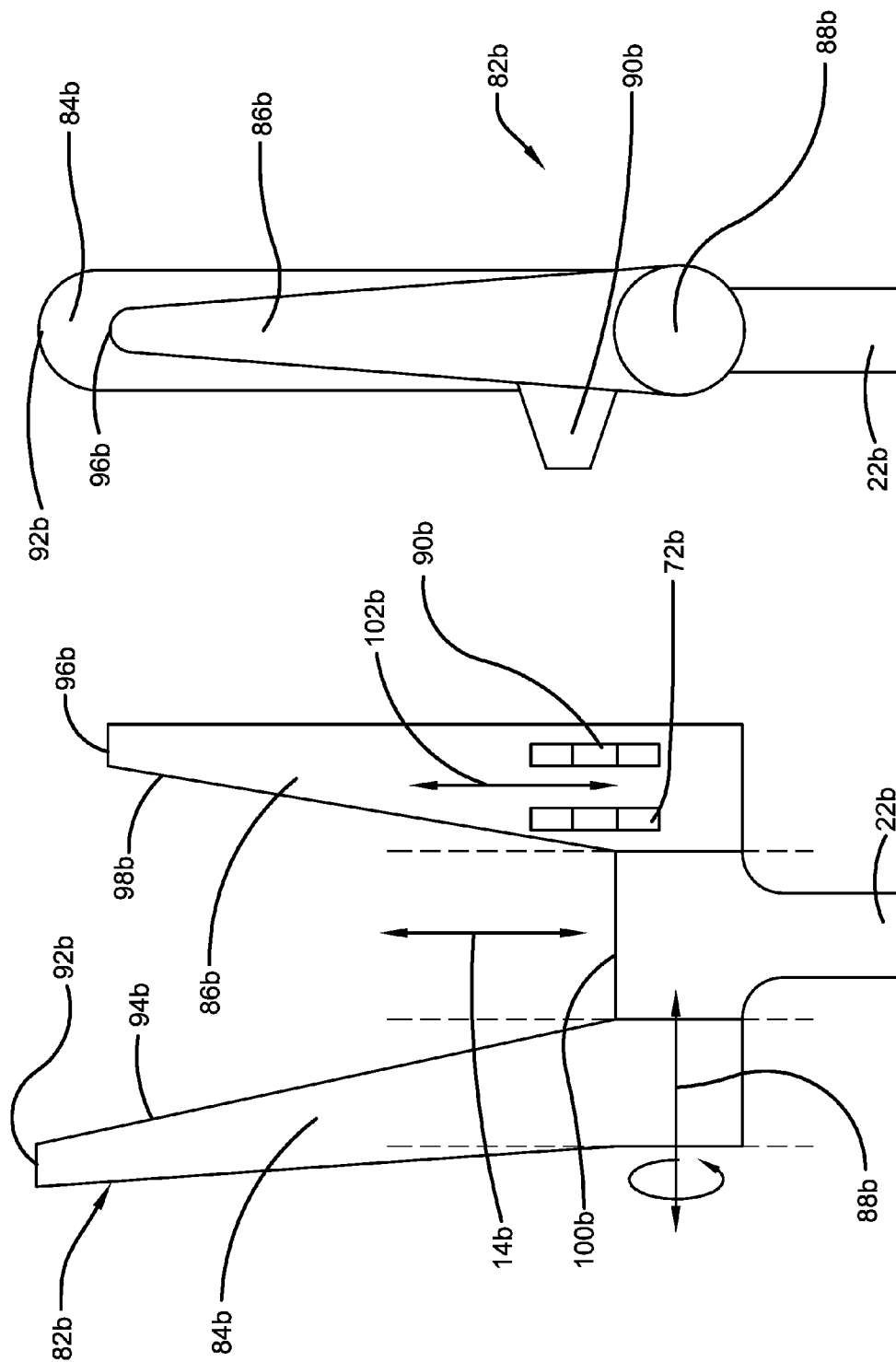

DEVICE FOR WINDING ELONGATE FLEXIBLE OBJECTS

BACKGROUND OF THE INVENTION

1. Field of the Invention

The invention relates to a device for winding elongate flexible objects such as electrical power cords.

2. Description of Related Prior Art

U.S. Pat. No. 5,348,240 discloses a DEVICE FOR WINDING AND STORAGE OF CORDS. The storage device for electrical extension cords includes a substantially elongated hollow tubular member having hollow end caps at either end from which extend winding arms. The winding arms are adapted to have an electrical extension cord or the like wrapped around them to form a coil of wire along the elongated body member between the arms. At one end of the first end member there is a rotatable hook for mounting the entire assembly including an extension cord. Along the body of the elongated member are two clamps for holding the plugs at either end of the extension cord in place. The plug clamps are movable longitudinally along the body of the elongated member to allow for adjustment for different lengths of extension cord. A tubular extension member is partially mounted internally of the elongated member such that it may move in or out of the body of the elongated member to form an adjustable support for positioning against the ground during winding. When not in use, the extension member may be substantially entirely positioned within the elongated member.

SUMMARY OF THE INVENTION

In summary, the invention is a device for winding elongate flexible objects. The device includes a rigid member extending along a central axis between first and second ends. The device also includes a first fork having a base mounted to the rigid member at the first end of the rigid member and a plurality of tines supported on the base. The device also includes a second fork member having a base mounted to the rigid member at the second end of the rigid member and a plurality of tines supported on the base. The first fork and the second fork are further defined as both being removably engaged with the rigid member.

BRIEF DESCRIPTION OF THE DRAWINGS

The detailed description set forth below references the following drawings:

FIG. 3 is a front view of a fork that can be associated with an exemplary embodiment of the broader invention; and FIG. 4 is a side view of the fork shown in FIG. 3.

DETAILED DESCRIPTION OF EXEMPLARY EMBODIMENTS

Figures 1A, 1B:
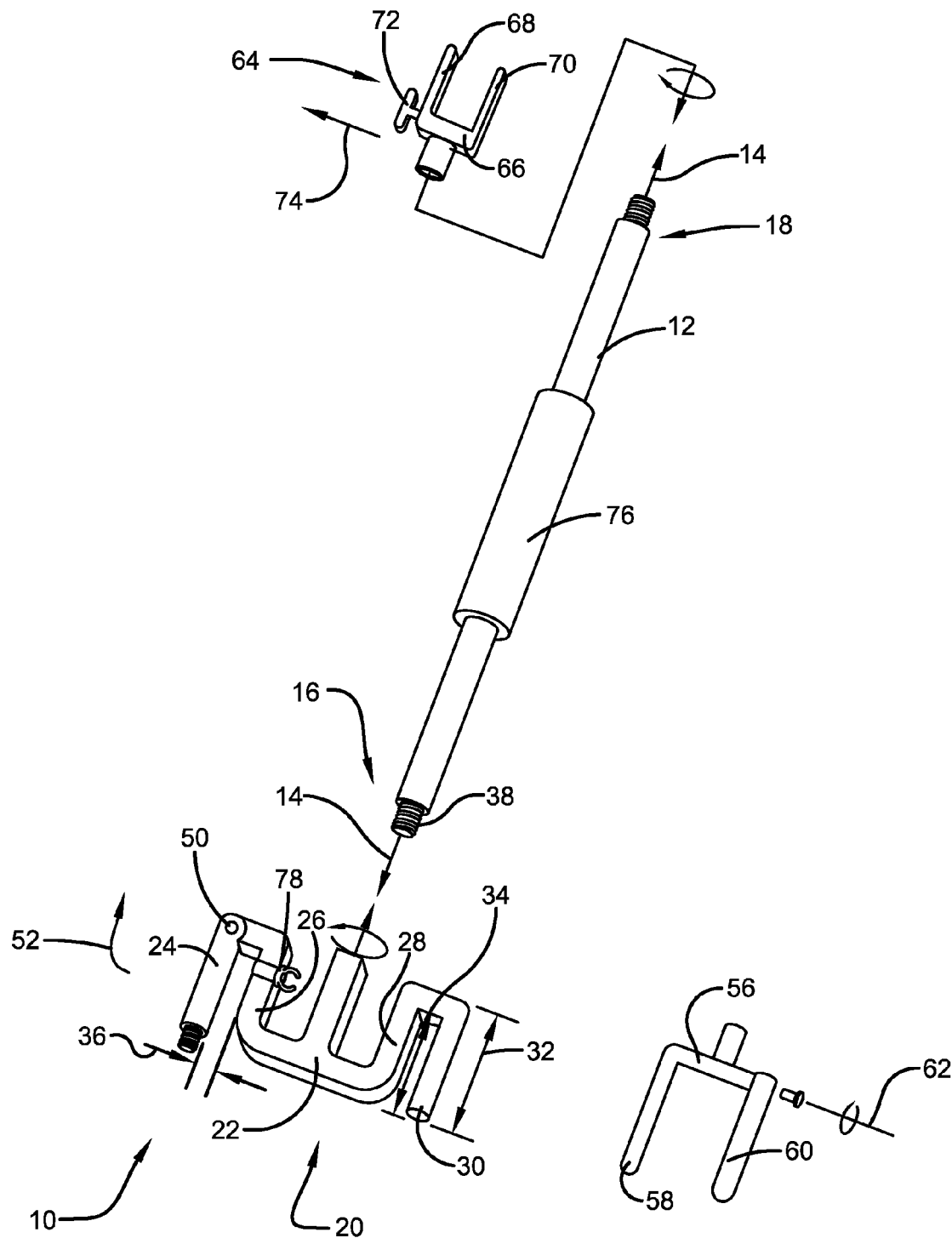
FIG. 1A is an exploded view of an exemplary embodiment of the broader invention
FIG. 1B is a perspective view of another fork that can be utilized with the structures of FIG. 1A.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiments described below, can provide a construction-grade hand winding/storage device, with adjustable/selectable winding region lengths and interchangeable winding fork accessories. Embodiments can simplify and ease winding, carrying, storing, and removing electrical power cords, hoses, ropes, and other elongated objects.

In the exemplary embodiment, a rigid member can be a construction grade rod that can withstand impact, twisting, and pulling forces. The exemplary embodiment can accommodate different lengths of wound objects, resulting in more desirable elongated shapes suited to the respective lengths of the wound object(s). Embodiments can reduce the total number of wound lengths, twisting, compression, and material fatigue in the wound object.

A fork according to one or more embodiments can be strong and impact resistant. The fork can easily connect to the rigid member. The fork can cradle the wound object and eliminate tangles. The interconnection between the fork and rigid member can be universal, replaceable, and/or interchangeable. One of the tines of the fork can be rotatable to eliminate the burden of unwinding the object.

FIG. 1 shows an exemplary device 10 for winding elongate flexible objects. The flexible object can be an electrical power cord, a hose, or any other kind of flexible, windable, elongated object. The device 10 includes a rigid member 12 extending along a central axis 14 between first and second ends 16, 18.

The rigid member 12 can be a one-piece integrally-formed shaft, hollow or solid. "Integrally-formed" refers to the fact that in the exemplary embodiment the rigid member can be formed at one time rather than being formed as separate components that are subsequently joined together. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

The device 10 also includes a first fork 20 having a base 22 mounted to the rigid member 12 at the first end 16 of the rigid member 12. The exemplary rigid member 12 can directly and releasibly engage the first fork 20, such as through male threads 38 defined by the rigid member 12 and female threads (not visible) defined by the base 22.

Figure 2:
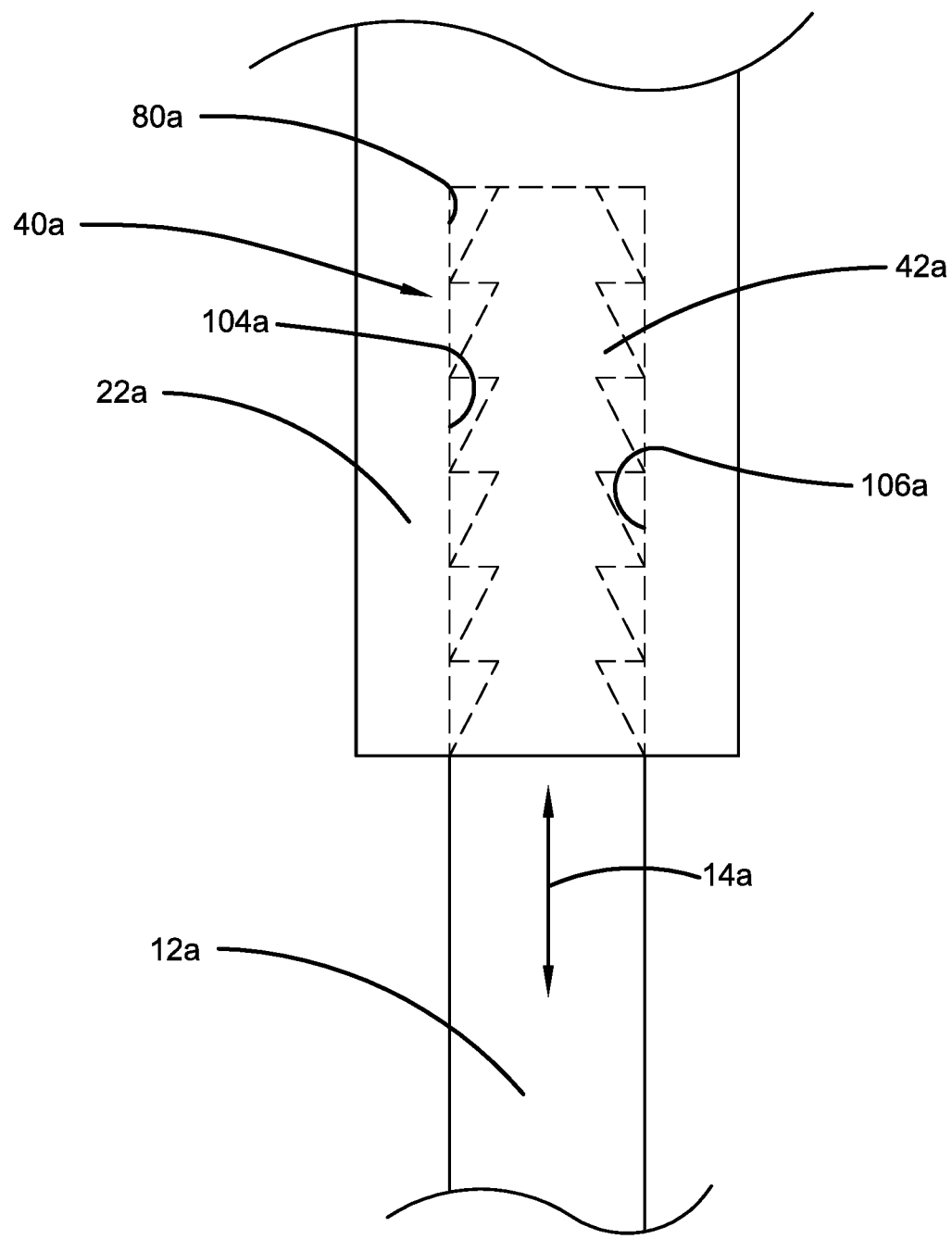
FIG. 2 is cross-sectional view of a connecting arrangement that can be applied in one or more embodiments of the broader invention.

FIG. 2 shows an alternative embodiment in which rigid member can be directly and releasibly engaged with a fork through burrs. A connecting structure 40a can be defined a rigid member 12a. The connecting structure 40a is shown in dash line since it is disposed within an aperture 80a formed in a base 22a of a fork. The connecting structure 40a can be generally square in cross-section and define burrs on corners, such as burr 42a. The base 22a can also have a square cross-section. A square cross-section can be desirable to prevent relative rotation between the fork and the rigid member. The burrs, such as burr 42a, can dig into the plastic body of the base 22a during insertion of the connecting structure 40a in the base 22a. The interaction between the burrs and the base 22a can resist movement between the base 22a and the rigid member 12a attached to the plastic connecting structure 40a. FIG. 2 shows that the aperture 80a comprises a flat profile on both sides of a central axis 14a, the flat profiles referenced at 104a and 106a.

Referring again to FIG. 1, the first fork 20 can have a plurality of tines 24, 26, 28, 30 supported on the base 22. The exemplary tines 24, 26, 28, 30 can tine lengths, depths, and tine gaps. A length of tine 30 is referenced at 32. A depth of tines 28 and 30 is referenced at 34. A gap between tines 24 and 26 is referenced at 36.

The exemplary tines 26, 28 of the first fork 20 are mounted directly to the base 22 of the first fork 20. The exemplary tines 24 and 30 of the first fork 20 are mounted indirectly to the base 22 of the first fork 20. The tine 24 is connected to the base 22 through the tine 26. Further, the tine 24 is connected to the tine 26 through a pivot pin 50. The tine 24 can pivot about the pin 50 along an arc referenced at 52. The pivot axis defined by the pin 50 extends transverse to and spaced from the central axis 14. Pivoting of the tine 24 allows an elongate object held in between the tines 24 and 26 to be removed from the device 10 without being unwound. In other words, pivoting of a tine allows for quick-release of the elongate object.

The tines 24 and 26, or the tines 28 and 30, can be viewed as a single tine. Embodiments of the invention can be practiced with numerous configurations of tines. The single tine formed by the combination of the tines 28 and 30 extends along a torturous path. A "torturous" path includes a plurality of direction changes. The single tine formed by the combination of the tines 24 and 26 also extends along a torturous path.

The device 10 also includes a second fork member having a base releasibly mounted to the rigid member 12 at the second end 18 of the rigid member 12 and a plurality of tines supported on the base. FIG. 1 shows several different configurations of forks, fork 20 being a first configuration. It can be desirable that the same configuration of fork be used at both ends 16, 18 of the rigid member 12 in the exemplary embodiment. However, identical (or substantially identical) forks are not required of the broader invention.

In an embodiment having the same configuration of forks at both ends, the first and second forks can be centered on the central axis 14 and each can be symmetric about the central axis 14. The fork 20 is substantially symmetric, since the presence of the pin 50 upsets perfect symmetry. The fork 20 could be made perfectly symmetrical by adding a pivot pin between the tines 28 and 30 or by omitting the pivot pin 50 between the tines 24 and 26.

FIGS. 1A and 1B show two configurations of alternative forks. A fork 54 includes a base 56 and two tines 58, 60. The tine 60 is mounted for pivoting movement relative to the base 56 about a pivot axis 62 extending transverse to and intersecting the central axis 14. A fork 64 includes a base 66 and two tines 68, 70. A protuberance 72 projects laterally from the base 22 transverse to and away from the central axis 14, in a first direction referenced at 74. The protuberance 72 extends further from the central axis 14 in the first direction 74 than either tine 68, 70 of the first fork 20. The protuberance 72 can be useful for hanging the device 10 when stored (either with a wound object or without a wound object). The exemplary protuberance 72 has a wider portion and a neck portion for being received in a bracket with a variable width slot, but could take other forms in other embodiments of the invention, such as a hook.

An embodiment of the invention could be practiced as a kit including a one or more rigid members and pairs of mating forks. For example, one kit could include rigid member 12, two forks 20, two forks 54, and two forks 64. Another kit could include rigid members of different lengths. A kit would be desirable to allow the user numerous options in arranging and storing elongate, flexible objects.

Another feature of the exemplary embodiment is a sleeve 76 encircling the rigid member 12 along the central axis 14 between the first end 16 and the second end 18. The sleeve 76 can be made of foam, open cell or closed cell. The sleeve can be made of rubber, silicone, or some other flexible or rigid plastic. The sleeve 76 can define ribs or other surface patterns to enhance gripping by the user's hand.

Another feature of the exemplary embodiment is a clamp 78 mounted on one of the plurality tines. The exemplary clamp 78 is mounted on the tine 26. The position of the clamp 78 along the tine 26 is adjustable. The clamp 78 can be used to retain an end of a flexible elongate object, such as an outlet of an electrical power cord. The exemplary clamp 78 can be formed in part as a pipe clamp that encircles the tine 26 can be selectively tightened or loosened. The exemplary clamp 78 can also be formed in part as a hook or as spring-biased pinching arms that can selectively grasp and release a portion of the elongate object.

FIGS. 3 and 4 show an alternative embodiment of the invention. A fork 82b includes tines 84b, 86b. The tine 84b is mounted for pivoting movement about a pivot axis 88b that would extend transverse to a central axis. The tine 84b is larger than the tine 86b to make the tine 84b easier to grasp and rotate. In other words, as clearly shown by FIGS. 3 and 4, the tine 84b is longer and extends further along the central axis 14b from the base 22b than the tine 86. FIGS. 3 and 4 also show that the first tine 84b includes a first distal end 92b remote from the base 22b and defines a first surface 94b confronting the second tine 86b. FIGS. 3 and 4 also show that the second tine 86b includes a second distal end 96b remote from the base 22b and defines a second surface 98bconfronting the first tine 84b. FIGS. 3 and 4 also show the first and second surfaces 94b, 98b are mirrored with respect to one another on opposite sides of the central axis 14b and continuously slope toward one another from the first and second distal ends 92b, 96b to the base 22b. FIGS. 3 and 4 also show that the exemplary base 22b includes a bottom surface 100b extending between the first and second surfaces 94b, 98b of the first and second tines 84b, 86b and that the bottom surface 100b is flat and cooperates with the first and second surfaces 94b, 98b to form a channel with a truncated V-shape. Another feature of the exemplary embodiment is a pair of protuberances 72b, 90b integrally-formed with the tine 86b. The protuberances 72b, 90b can be used to retain an end of a flexible elongate object, such as an outlet of an electrical power cord. FIGS. 3 and 4 also show that the pair of protuberances 72b, 90b are spaced from one another and each projects from the fork 82b parallel to the central axis 22b, wherein a gap between the pair of protuberances 72b, 90b is centered along an axis 102b that is parallel to the central axis 22b.

It is noted that the various forks shown in this application can be universal with respect to a rigid member. In other words, the components can be formed such that the forks 20, 54, 64, or 82b could be engaged with a particular rigid member. Threads can be the structure for releasibly interconnecting the structures or burrs could be applied. It is noted that burrs could be used two or three or more times before a fork is replaced.

The tines of a fork used in a particular embodiment of the broader invention can be or various lengths. For some elongate members, such as half-inch hose, the tines may be longer than the tines of a fork used for electrical power cords.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A device for winding elongate flexible objects and comprising:
   a rigid member extending along a central axis between first and second ends;
   a first fork having a base mounted to said rigid member at said first end of said rigid member and a plurality of tines supported on said base;
   a second fork member having a base mounted to said rigid member at said second end of said rigid member and a plurality of tines supported on said base; and
   wherein said first fork and said second fork are further defined as both being removably engaged with said rigid member and wherein at least one of said first fork and said second fork is further defined as being square in cross-section, preventing relative rotation between said at least one of said first fork and said second fork and said rigid member; and a pair of protuberances spaced from one another and each projecting from said first fork in a direction parallel to said central axis, wherein a gap between said pair of protuberances is centered along an axis that is parallel to said central axis.

2. The device of claim 1 wherein said at least one of said first fork and said second fork is further defined as being removably engaged to said rigid member with burrs.

3. The device of claim 1 wherein one of at least one of said first fork and said second fork wherein said plurality of tines of said first fork comprises at least one tine mounted for pivoting movement about a pivot axis extending transverse to said central axis and said at least one tine is longer and extends further along said central axis from said base of said first fork than the other of said plurality of tines of said first fork.

4. The device of claim 1 wherein:
   said first tine includes a first distal end remote from said base and defines a first surface confronting said second tine;
   said second tine includes a second distal end remote from said base and defines a second surface confronting said first tine; and
   wherein said first and second surfaces are mirrored with respect to one another on opposite sides of said central axis and continuously slope toward one another from said first and second distal ends to said base.

5. The device of claim 4 wherein said base further comprises
   a bottom surface extending between said first and second surfaces of said first and second tines, said bottom surface is flat and cooperates with said first and second surfaces to form a channel with a truncated V-shape.

6. A device for winding elongate flexible objects and comprising:
   a rigid member extending along a central axis between first and second ends;
   a first fork having a base mounted to said rigid member at said first end of said rigid member and a plurality of tines supported on said base;
   a second fork member having a base mounted to said rigid member at said second end of said rigid member and a plurality of tines supported on said base;
   wherein said first fork and said second fork are further defined as both being removably engaged with said rigid member; and
   wherein said at least one of said first fork and said second fork is further defined as being removably engaged to said rigid member with burrs; and a pair of protuberances spaced from one another and each projecting from said first fork in a direction parallel to said central axis, wherein a gap between said pair of protuberances is centered along an axis that is parallel to said central axis.

7. The device of claim 6 wherein:
   said burrs are defined by one of said rigid member, said first fork, and said second fork;
   said burrs are received in an aperture defined by the other of said rigid member, said first fork, and said second fork; and
   said aperture comprises a flat profile on at least one side of said central axis.

8. The device of claim 7 wherein said aperture comprises a flat profile on both sides of said central axis.

9. The device of claim 6 wherein one of at least one of said first fork and said second fork wherein said plurality of tines of said first fork comprises at least one tine mounted for pivoting movement about a pivot axis extending transverse to said central axis and said at least one tine is longer and extends further along said central axis from said base of said first fork than the other of said plurality of tines of said first fork.

10. The device of claim 6 wherein:
    said first tine includes a first distal end remote from said base and defines a first surface confronting said second tine;
    said second tine includes a second distal end remote from said base and defines a second surface confronting said first tine; and
    wherein said first and second surfaces are mirrored with respect to one another on opposite sides of said central axis and continuously slope toward one another from said first and second distal ends to said base.

11. The device of claim 10 wherein said base further comprises
    a bottom surface extending between said first and second surfaces of said first and second tines, said bottom surface is flat and cooperates with said first and second surfaces to form a channel with a truncated V-shape.

12. A device for winding elongate flexible objects and comprising:
- a rigid member extending along a central axis between first and second ends;
- a first fork having a base mounted to said rigid member at said first end of said rigid member and a plurality of tines supported on said base;
- a second fork member having a base mounted to said rigid member at said second end of said rigid member and a plurality of tines supported on said base;
- wherein said first fork and said second fork are further defined as both being removably engaged with said rigid member; and
- wherein said plurality of tines of said first fork comprises at least one tine mounted for pivoting movement about a pivot axis extending transverse to said central axis and said at least one tine is longer and extends further along said central axis from said base of said first fork than the other of said plurality of tines of said first fork; and a pair of protuberances spaced from one another and each projecting from said first fork in a direction parallel to said central axis, wherein a gap between said pair of protuberances is centered along an axis that is parallel to said central axis.

13. The device of claim 12 wherein at least a portion of said at least one tine is further defined as wider than at least a portion of at least one of said other of said plurality of tines of said first fork.

14. The device of claim 12 wherein:
- said first tine includes a first distal end remote from said base and defines a first surface confronting said second tine;
- said second tine includes a second distal end remote from said base and defines a second surface confronting said first tine; and
- wherein said first and second surfaces are mirrored with respect to one another on opposite sides of said central axis and continuously slope toward one another from said first and second distal ends to said base.

15. The device of claim 14 wherein said base further comprises
- a bottom surface extending between said first and second surfaces of said first and second tines, said bottom surface is flat and cooperates with said first and second surfaces to form a channel with a truncated V-shape.

* * * * *